UNITED STATES PATENT OFFICE.

JOHN COWDERY MARTIN, OF HAMMERSMITH, COUNTY OF MIDDLESEX, ENGLAND.

MANUFACTURE OF PIGMENTS.

SPECIFICATION forming part of Letters Patent No. 440,232, dated November 11, 1890.

Application filed February 8, 1889. Serial No. 299,179. (No specimens.) Patented in England May 5, 1887, No. 6,619; in Belgium May 4, 1888, No. 60,789, and in France May 7, 1888, No. 190,458.

*To all whom it may concern:*

Be it known that I, JOHN COWDERY MARTIN, chemist, a subject of the Queen of Great Britain, residing at 209 The Grove, Hammersmith, in the county of Middlesex and Kingdom of Great Britain, have invented certain new and useful Improvements in the Manufacture of Pigments, (patented in England May 5, 1887, No. 6,619; in France May 7, 1888, No. 190,458, and in Belgium May 4, 1888, No. 60,789,) of which the following is a specification.

I incorporate sulphate of baryta or sulphate of lime or a mixture of these substances with a small proportion of calcium oxide (lime) in the hydrated condition of slaked lime, and I further incorporate these and cause them to enter more or less into combination with one or other of the following substances by crushing them together in either a wet or dry condition under edge runners or other suitable crushing machinery—that is to say, zinc oxide or zinc sulphide (preferably as regards the latter that is known commercially by that name) may each be incorporated with a mixture of hydrated calcium oxide and sulphate of baryta or a mixture of calcium oxide and sulphate of lime; also, the oxide of zinc may be incorporated with a small proportion of hydrated calcium oxide without the addition of the above-named sulphates. The materials are more or less reduced in bulk by the treatment and become of increased density or specific gravity.

When zinc oxide and hydrated calcium oxide are crushed together in a wet condition and afterward dried and again crushed, the bulk of the mixture is reduced and the density or specific gravity increased about thirty per cent.—that is to say, one hundred and fifty parts of such mixture so treated become sufficiently reduced in bulk to occupy little more than the space occupied by one hundred parts of zinc oxide previous to treatment. The mixture also after combination forms with oil a tough compound, resembling white lead in texture.

When making a pigment with zinc oxide and sulphate of baryta and sulphate of lime, as above described, the proportions of the several materials may vary; but I have obtained good results when the zinc oxide forms two-thirds of the weight of the pigment, the hydrated calcium oxide about seven per cent., and the sulphate of baryta, or equal parts of sulphate of baryta and sulphate of lime, the remainder; but the proportion of sulphate of lime or sulphate of baryta may be largely increased. Similar proportions of the hydrated calcium oxide to that above specified may be employed when using zinc oxide and hydrated calcium oxide alone without the above-named sulphates.

Although I have given the proportions of the materials I have found to answer well, I do not confine myself to these, as sometimes I use as little hydrated calcium oxide as three per cent. or less of the weight of the pigment, and sometimes as much as fifteen per cent. may be used.

Although the materials forming the pigments may be crushed together at once in a dry condition, as above described, the effect of the treatment is increased when these are crushed together wet, then dried, and again crushed after drying. They may, however, be simply mixed together dry without crushing, but with less effect. The sulphate of lime used I prefer to be so far calcined or burnt as would prevent its setting or becoming excessively hydrated when tested by adding water to it. The hydrated calcium oxide may be added to each or either of the constituents of the pigment and crushed with it separately, as described, and the whole further incorporated in the same manner.

The use, as described, of hydrated calcium oxide with sulphate of baryta or sulphate of lime produces (without the addition of the other above-named metallic oxides) pigments, a sufficient proportion of the constituents of which combine chemically with and more or less saponify the oil used as a vehicle for their distribution.

I would have it understood that I do not claim calcium oxide combined with any of the materials described when these are also combined with tar, pitch, or like resinous matters, as I am aware such compositions have been suggested for use on ships' bottoms.

I claim—

In the manufacture of paints or pigments, the combination of oxide or sulphide of zinc, hydrated calcium oxide, and a sulphate of an alkaline earth, substantially as set forth.

In testimony that I claim the foregoing as my invention I have signed my name in presence of two subscribing witnesses.

J. C. MARTIN.

Witnesses:
STEPHEN EDWARD GUNYON,
115 *Cannon Street, London.*
THOS. CAPEL HULLETT,
93 *Pelton Road, East Greenwich, S. E.*